(12) United States Patent
Cattrone et al.

(10) Patent No.: US 7,712,671 B2
(45) Date of Patent: May 11, 2010

(54) DOCUMENT PRINTING AND SCANNING METHOD USING LOW RESOLUTION BARCODE TO ENCODE RESOLUTION DATA

(75) Inventors: Paul Cattrone, Pleasant Hill, CA (US); Hiroshi Tomite, Palo Alto, CA (US); Vlvek Pathak, Mountain View, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 869 days.

(21) Appl. No.: 11/343,621

(22) Filed: Jan. 31, 2006

(65) Prior Publication Data

US 2007/0176001 A1    Aug. 2, 2007

(51) Int. Cl.
    *G06K 19/06* (2006.01)
(52) U.S. Cl. .................................. 235/487
(58) Field of Classification Search .......... 235/494, 235/487
    See application file for complete search history.

(56) References Cited

U.S. PATENT DOCUMENTS

| | | | |
|---|---|---|---|
| 5,113,445 A | | 5/1992 | Wang |
| 5,128,527 A | * | 7/1992 | Kawai et al. ........... 235/462.07 |
| 5,760,382 A | | 6/1998 | Li et al. |
| 6,158,660 A | * | 12/2000 | Blanford et al. ........ 235/462.11 |
| 7,229,025 B2 | * | 6/2007 | Sussmeier et al. ........... 235/494 |
| 7,523,865 B2 | * | 4/2009 | Tomita .................. 235/462.09 |
| 2005/0091170 A1 | * | 4/2005 | Nambudiri .................... 705/62 |
| 2007/0143737 A1 | * | 6/2007 | Huang et al. ................ 717/103 |

OTHER PUBLICATIONS

Complaint by Altavion Inc. in *Altavion, Inc. v. Konica Minolta Systems Laboratory, Inc.* et al, Superior Court of the State of California, County of San Mateo, Case No. CIV 467662, dated Nov. 8, 2007.
First Amended Complaint by Altavion, Inc. In *Altavion, Inc. v. Konica Minolta Systems Laboratory, Inc.* et al, Superior Court of the State of California, County of San Mateo, Case No. CIV 467662, dated Dec. 15, 2008.

* cited by examiner

*Primary Examiner*—Jamara A Franklin
(74) *Attorney, Agent, or Firm*—Chen Yoshimura LLP

(57) ABSTRACT

A document is printed on a recoding medium together with a high resolution 2d barcode that encodes desired information about the document, and a low resolution 2d barcode that encode resolution data that specifies the spatial resolution of the high resolution barcode. The low resolution barcode has a sufficiently low spatial resolution so that it can be adequately read by a majority of scanners at their low resolution settings. Thus, if the printed document is scanned at a low scan resolution, the low resolution barcode can be adequately read to extract the resolution data in order to determined whether the scan resolution is adequate for reading the high resolution barcode. If necessary, the printed document can be re-scanned at a higher scan resolution so that the high resolution barcode can be adequately read. Alternatively, the resolution data may specify the print resolution at which the document is printed.

18 Claims, 3 Drawing Sheets

DOCUMENT PRINTING AND SCANNING METHOD USING LOW RESOLUTION BARCODE TO ENCODE RESOLUTION DATA

BACKGROUND OF THE INVENTION

1. Field of the Invention

This invention relates to printing and reading of two-dimensional barcode or other form of machine-readable symbology for encoding data, and in particular, it relates to a method and apparatus for enhancing the reliability of reading such barcode.

2. Description of the Related Art

Barcode is a form of machine-readable symbology for encoding data, and has been widely employed in a variety of application fields. Two-dimensional barcode (2d barcode), which is one mode of such symbology, can be used to encode text, numbers, images, and binary data streams in general. One widely used 2d barcode standard is the PDF417 standard, and software and hardware products have been available to print and read such 2d barcode. Color barcode has also been used. 2d barcode is formed of an array of two-dimensional tiles having different values as represented by the printed density and/or color of the tile. The values may be binary (e.g. black and white) or multi-valued (e.g. gray level), and may have a single color channel (i.e. black, red, etc.) or multiple color channels (e.g. red, green and blue). A 2d barcode can be printed on a label and then affixed to an object or a printed document, or it can be directly printed with a document on the same recording medium. A 2d barcode can be read by a specialized barcode scanner, or, if the barcode is a part of a printed document, the document can be scanned and software in the scanner or a computer can detect the barcode and extract the encoded data.

SUMMARY OF THE INVENTION

An object of the present invention is to provide a method for enhancing the reliability of reading of high resolution barcode.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other object, as embodied and broadly described, the present invention provides a method for printing a document, which includes: generating first barcode encoding information about the document; generating second barcode having a spatial resolution lower than a spatial resolution of the first barcode, the second barcode encoding resolution data that specifies the spatial resolution of the first barcode; and printing the document and the first and second barcode on a recording medium.

In another aspect, the present invention provides a method for processing a printed document, the printed document containing first barcode encoding information about the document and second barcode encoding resolution data that specifies a spatial resolution of the first barcode, the second barcode having a spatial resolution lower than the spatial resolution of the first barcode, the method including: scanning at least a portion of the printed document at a first scan resolution to generate a scanned document; detecting the second barcode in the scanned document and extracting the resolution data encoded therein; comparing the spatial resolution of the first barcode specified in the resolution data to the first scan resolution to determine whether the first scan resolution is adequate; re-scanning the printed document at a second scan resolution based on a result of the comparing step to generate a re-scanned document; and detecting the first barcode in the scanned document or the re-scanned document and extracting the information encoded therein.

In yet another aspect, the present invention provides a method for printing a document, which includes: generating first barcode encoding resolution data that specifies a print resolution of the document; and printing the document and the first barcode on a recording medium at the print resolution.

The present invention is also directed to computer program products that cause a data processing apparatus to perform related document printing and processing methods.

In yet another aspect, the present invention is also directed to a recording medium on which a document and barcode are printed, the barcode encoding resolution data that specifies a print resolution at which the document and the barcode are printed.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
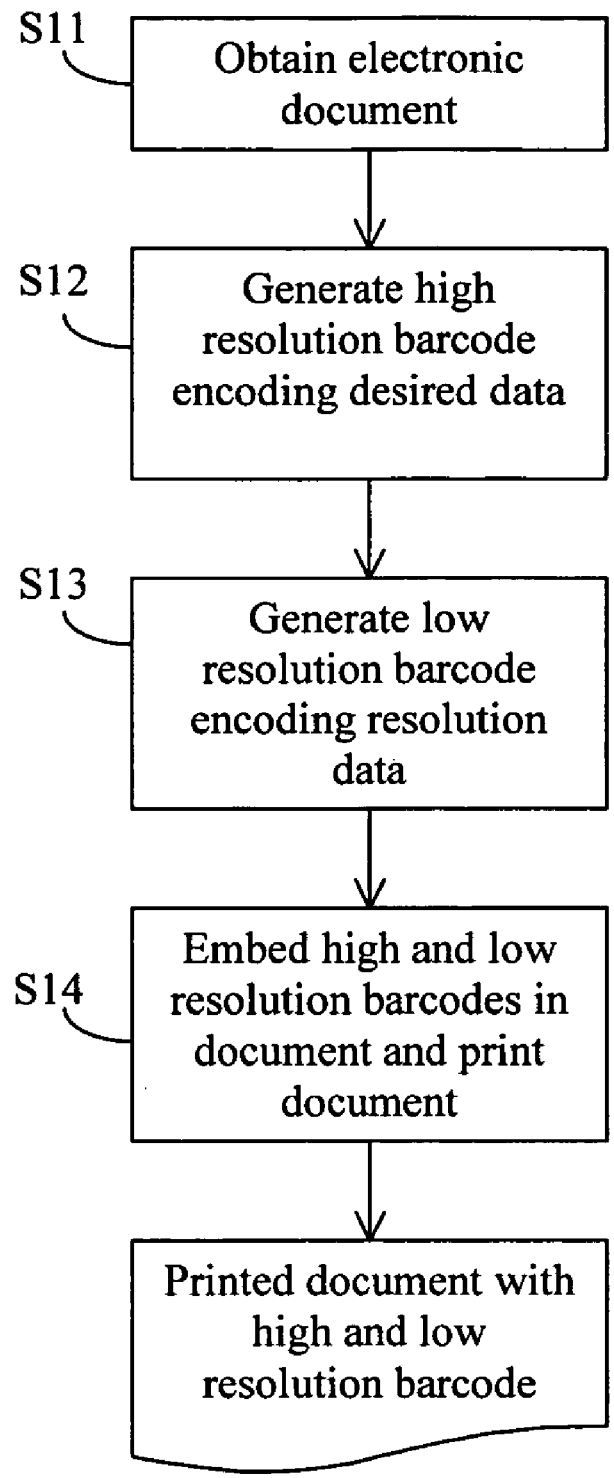
FIG. 1 is a flow chart showing a printing method according to an embodiment of the present invention.

To increase the capacity of 2d barcode per unit area occupied by the printed barcode, it is desirable to reduce the size of the tiles making up the barcode. This is especially true for some applications of data encoding and document management which require encoding large amount of information in 2d barcode and printing the barcode on the same recording medium as the document. One such application is a method of authenticating a printed document, which requires encoding the full or partial content of the document (text, image, graphics, etc.) as 2d barcode and printing the barcode in blank areas of the printed document or on the back side of the printer document. A printed document can be authenticated by reading the barcode carried thereon to extract the encoded content, and comparing the extracted content with the content of the document itself (the uuencoded content) to determine whether the document has been altered since it was originally printed. In this type of applications, due to the large amount of data to be encoded in the barcode, it is desirable to increase the information density of the 2d barcode by using barcode with a relatively high spatial resolution, i.e., barcode having a relatively small tile size.

To read a 2d barcode, a hard copy document bearing the barcode is scanned to generate a bitmap image (unless the document is already in such an electronic form). A step in detecting barcode in a bitmap image is to identify the individual tiles of the barcode, i.e., to determine which groups of pixels form individual tiles. To adequately identify the tiles, the hard copy document must have been scanned with adequate spatial resolution so that each tile corresponds to at least a minimal number of pixels. If the scanning resolution is inadequate, the barcode cannot be reliably read. For example, a 2d barcode may have been printed with a 300 dpi printer resolution and have a tile size of 5 dots by 7 dots, i.e., a physical tile size of 5/300 inches by 7/300 inches. (A barcode printed with a 600 dpi resolution and having a tile size of 10 by 14 dots will have the same physical tile size.) When such barcode is scanned back with a scanner resolution of 300 dpi, each tile will produce approximately 5 by 7 same-colored pixels. Thresholding or other techniques may be used to treat pixels at the edge of tiles. Scanning such a barcode with a higher scan resolution (especially a scan resolution that is an integer multiple of the print resolution) would produce a higher resolution bitmap which would likely allow adequate identification of the tiles. If, however, this barcode is scanned back with a lower scan resolution, the bitmap may not have adequate resolution to read the barcode. For example, if the scan resolution is 100 dpi, then each tile will produce 1 or 2 pixels in one direction and 2 or 3 pixels in the other direction, which is likely inadequate for reliable detection of the tiles. While the scanned bitmap may be manipulated to compensate for differences in print and scan resolutions, scanning the barcode at the same resolution at which the document is printed (or a resolution that is an integer multiple of the printing resolution) produces more reliable result in reading the barcode.

Scanners used to scan printed documents often offer multiple levels of resolution settings. The maximum spatial resolution of a scanner is determined by hardware limitations, but a scanner and/or a driver that drives the scanner often allows a user to set the scan resolution (in units of dpi, dots per inch) for individual scan jobs. Higher scanning resolutions are often desired for scanning images, but result in larger file sizes of the scanned documents. For text documents, on the other hand, higher resolutions are often not necessary, and lower scan resolutions can often be used to generate smaller scanned files without compromising the legibility of the documents. Thus, a user may tend to select a lower scan resolution when scanning text documents, and as a result, high resolution barcode contained in the document may not be scanned with an adequate scan resolution.

Thus, according to embodiments of the present invention, when a document is printed, a low resolution 2d barcode is printed on the same recording medium as the document, and carries information that specifies the resolution of a high resolution 2d barcode present within the document. The high resolution barcode may encode any desired information about the document, such as authentication information described above. The low resolution barcode encodes resolution data that specifies the spatial resolution of the high resolution barcode, which may include a print resolution at which the document is printed. The low resolution barcode preferably contains a predefined data pattern to signify that it contains resolution data. Since both the high resolution and the low resolution barcode are printed using the same print resolution (because they are a part of the same printed document), the low resolution barcode is achieved by printing more dots per tile. It should be understood that the terms "high resolution" and "low resolution" refer to the relative resolution of the two barcodes. The low resolution barcode has a sufficiently large tile size so that it can be adequately read by a majority of the scanners for which the document is intended at their low resolution settings. The actual resolution of the low resolution barcode will depend on the resolution settings of scanners being used in a particular time period and particular market. The resolution of the low resolution barcode is preferably adjustable. Since the low resolution barcode only needs to encode a small amount of information (i.e. the resolution of the high resolution barcode or the print resolution), the area occupied by the low resolution barcode is small.

The low resolution barcode may be a barcode stamp separate from the high resolution barcode (a barcode stamp is a barcode printed in a discrete area, usually rectangular, surrounded by non-printed margins), or a part of a barcode stamp that includes both high resolution barcode and low resolution barcode. The high and low resolution barcode can be printed anywhere on the document, either set by default or selected by the user. For example, if the high resolution barcode contains authentication information which typically occupies a large area, it may be printed on the back side of the document. The low resolution barcode may be printed on the front side of the first page of the document, such as in a margin or footer area. When a barcode is said to be printed on the same recoding medium as the document, it is meant that the barcode is printed on the same physical medium (i.e. a sheet of paper) on which at least a portion of the document is printed.

The resolution data may specify the resolution of the high resolution barcode in a variety of ways. The resolution of the high resolution barcode may be specified by the physical size of the tiles, e.g., in terms of inches in each dimension. Alternatively, it may be specified by the number of dots per tile together with the print resolution of the barcode (i.e. the print resolution of the document) in units of dots per unit length. For example, the resolution of the barcode may be specified as 5 by 7 dots printed at a 300 dpi resolution. As another alternative, the number of dots per tile may be prescribed by a standard according to which the barcode is generated, and the knowledge of the standard being used may be conveyed to the scanner in a suitable manner (e.g., by convention or by information carried in the document itself), in which case only the print resolution of the document needs to be included in the resolution data to fully specify the resolution of the high resolution barcode. As yet another alternative, the resolution data may include only the print resolution of the document, and the physical size of the tiles can be calculated or estimated from the bitmap image using appropriate algorithms.

Figure 2:
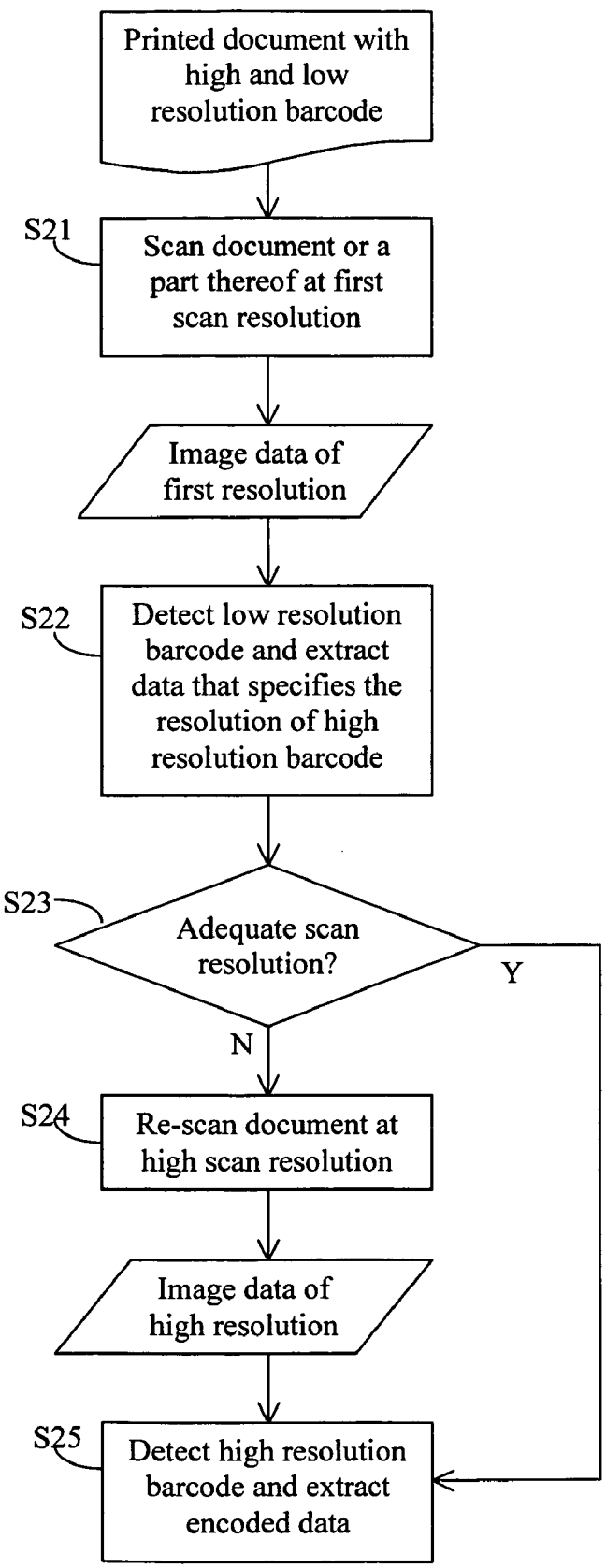
FIG. 2 is a flow chart showing a barcode reading method according to an embodiment of the present invention.

FIGS. 1 and 2 illustrate a print method and read method, respectively, according to embodiments of the present invention. The methods are implemented in a data processing system which includes one or more processors and a storage storing software. The software is executed by the processor(s) to carry out the methods. As shown in FIG. 1, in a print process, the data processing system obtains an electronic document to be printed (Step S11), generates high resolution barcode that encodes desired data (Step S12), generates low resolution barcode that encodes resolution data which specify the resolution of the high resolution barcode (Step S13), embeds the high and low resolution barcode in the electronic document and prints the document on a recording medium (Step S14). The printed document thus include the content of the document itself, high resolution barcode that encodes desired data, and low resolution barcode that contains resolution data specifying the resolution of the high resolution barcode. In step S11, the electronic document to be printed may originate from any suitable source. The data encoded in the high resolution barcode in step S12 may be, for example, authentication data described earlier. In step S13, the resolution data to be encoded in the low resolution barcode may be obtained manually (e.g. entered by a user) or automatically (e.g. the data may be stored with the document, or obtained from the printer or the printer driver).

In a read process, as shown in FIG. 2, a printed document bearing high and low resolution barcode is scanned at a first scan resolution to generate first scanned image data (Step S21). The first scanned image data is processed to detect the low resolution barcode and to extract from it the resolution data that specifies the resolution of the high resolution barcode (Step S22). If the low resolution barcode contains a predefined data pattern to signify the resolution information as described earlier, then this may include detecting the data pattern to identify the resolution information. Then, the specified resolution of the high resolution barcode is compared to the first scan resolution to determine whether the first scan resolution is adequate for detecting the high resolution barcode (Step S23). If the first scan resolution is inadequate (No in Step S23), the document is re-scanned at a higher scan resolution, preferably the specified resolution of the high resolution barcode (Step S24). The high resolution barcode is detected either from the re-scanned high resolution image or from the image of the first scan if its resolution is adequate, and the data encoded therein is extracted (Step S25). The re-scanning step S24 may be carried out manually, semi-automatically or automatically. For example, an instruction can be displayed to instruct a human user to adjust the resolution setting and re-scan the document. Or, the scanner can automatically adjust the resolution and instruct the user to re-scan the document. Or, the scanner can automatically adjust the scan resolution and automatically re-route the original document back to the scanner to re-scan it. Or, if the low resolution barcode is present on the first page of the original document, the scanner can retain the first page in the scanner after scanning it, determine whether the scan resolution is adequate, and if necessary, automatically adjust the scan resolution and re-scan the first page.

Figure 3:
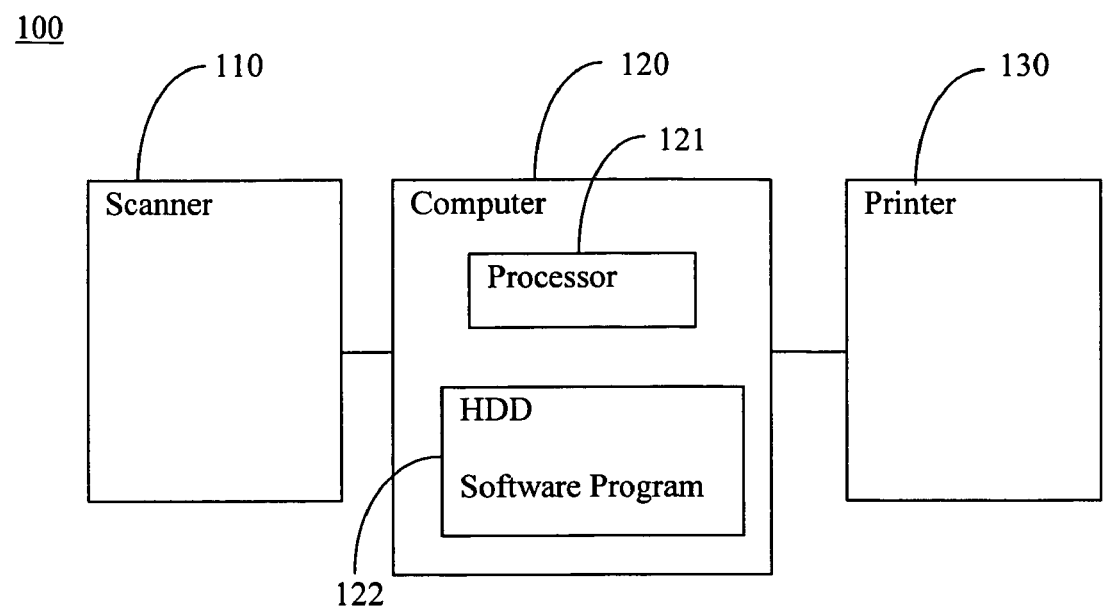
FIG. 3 is a structure of the data processing system in which embodiments of the present invention may be implemented.

The methods described above are implemented in a data processing system which includes a computer and a printer, scanner and/or copier connected to the computer. The typical structure of the data processing system is shown in FIG. 3. The data processing system 100 includes a scanner 110, a computer 120, and a printer 130, which are connected each other. The computer 120 comprises a processor 121 and a hard disk drive 122 storing the software programs. The processor 121 executes the software programs in the hard disk drive 122 to carry out the methods. In this typical example, the computer generates the high and low resolution barcodes and embeds them in the document to be printed, and submit the document for printing. The actual printing can be is accomplished in any suitable manner. Similarly, scanning of the document may be accomplished in any suitable manner, and the computer connected to the scanner detects the barcode and extract the encoded data, and causes the document to be re-scanned if necessary. Alternately, the software programs can respectively be stored in memories in scanner 110 and the printer 130, and can respectively be executed by the processors in the scanner 110 and the printer 130.

From the above descriptions, it can be seen that a feature of embodiments of the present invention is to embed in a printed document high resolution barcode to encode desired information and low resolution barcode to encode resolution data that specify the resolution of the high resolution barcode. An advantage of this method is that information about the resolution of the high resolution barcode is preserved in the printed document so that adequate resolution can be used to scan the high resolution barcode.

When the resolution data encoded in the low resolution barcode specifies the print resolution of the document itself, it also enables a user or the scanner to determine the optimum scan resolution for the entire document. For example, it is sometimes desirable to scan a printed document at a scan resolution close to the print resolution, and this can be achieved by extracting the print resolution from a low resolution barcode and adjusting the scan resolution accordingly. Thus, even when the document does not contain high resolution barcode, it may still be advantageous to print a relatively low resolution barcode that encodes information about the print resolution of the document.

Preferred embodiments of the present invention use 2d barcode to encode the metadata. Other machine-readable symbologies may also be used. For example, one-dimensional barcode may be used as the low resolution barcode to encode the resolution data. Both black and white and color 2d barcode may be used. Multiple barcodes may be used if necessary. As used in this disclosure, the term "barcode" should be broadly understood to refer to any machine-readable symbology that contains information, including but not limited to 1d and 2d barcodes. Depending on the context, the term "barcode" may refer to such machine-readable symbology in the printed or displayed form, or data in electronic form that, when printed or displayed, depicts a barcode.

It will be apparent to those skilled in the art that various modification and variations can be made in the selective image encoding and replacement method and apparatus of the present invention without departing from the spirit or scope of the invention. Thus, it is intended that the present invention cover modifications and variations that come within the scope of the appended claims and their equivalents.

What is claimed is:

1. A method for printing a document, comprising:
generating a first barcode encoding information about the document;
generating a second barcode having a spatial resolution lower than a spatial resolution of the first barcode, the second barcode encoding resolution data that specifies the spatial resolution of the first barcode; and
printing the document and the first and second barcodes on a recording medium.

2. The method of claim 1, wherein the first and second barcodes are two-dimensional barcodes each comprising an array of tiles.

3. The method of claim 2, wherein the resolution data specifies a physical size of the tiles of the first barcode.

4. The method of claim 2, wherein document and the first and second barcodes are printed at a print resolution defined by a number of printed dots per unit length, and wherein the resolution data further specifies the print resolution.

5. The method of claim 4, wherein the resolution data further specifies a size of the tiles of the first barcode defined by numbers of dots.

6. The method of claim 1, wherein the second barcode contains a predefined pattern to signify the resolution data.

7. A method for processing a printed document, the printed document containing a first barcode encoding information about the document and a second barcode encoding resolution data that specifies a spatial resolution of the first barcode, the second barcode having a spatial resolution lower than the spatial resolution of the first barcode, the method comprising:
scanning at least a portion of the printed document at a first scan resolution to generate a scanned document;
detecting the second barcode in the scanned document and extracting the resolution data encoded therein;
comparing the spatial resolution of the first barcode specified in the resolution data to the first scan resolution to determine whether the first scan resolution is adequate;
re-scanning the printed document at a second scan resolution based on a result of the comparing step to generate a re-scanned document; and
detecting the first barcode in the re-scanned document and extracting the information encoded therein.

8. The method of claim 7, wherein the first and second barcodes are two-dimensional barcodes each comprising an array of tiles.

9. The method of claim 8, wherein the resolution data specifies a physical size of the tiles of the first barcode.

10. The method of claim 8, wherein document and the first and second barcodes have been printed at a print resolution defined by a number of printed dots per unit length, and wherein the resolution data specifies the print resolution.

11. The method of claim 10, wherein the resolution data further specifies a size of the tiles of the first barcode defined by numbers of dots.

12. The method of claim 7, wherein the second barcode contains a predefined pattern to signify the resolution data, and wherein the step of detecting the second barcode detects the predefined pattern.

13. The method of claim 7, wherein the re-scanning step is carried out automatically.

14. The method of claim 7, wherein the re-scanning step is carried out manually.

15. A method for printing a document, comprising:
  generating a first barcode encoding resolution data that specifies a print resolution of the document;
  printing the document and the first barcode on a recording medium at the print resolution;
  generating a second barcode encoding information about the document; and
  printing the second barcode on the recording medium at the print resolution,
  wherein the first barcode has a spatial resolution lower than a spatial resolution of the second barcode.

16. The method of claim 15, wherein the first barcode and the second barcode are two-dimensional barcode each comprising an array of tiles.

17. A computer program product comprising a computer usable medium having a computer readable code embodied therein for controlling a data processing system, the computer readable program code configured to cause the data processing system to execute a process for printing a document comprising the steps of:
  generating a first barcode encoding information about the document;
  generating a second barcode having a spatial resolution lower than a spatial resolution of the first barcode, the second barcode encoding resolution data that specifies the spatial resolution of the first barcode;
  embedding the first and second barcode in the document; and
  submitting the document for printing.

18. A computer program product comprising a computer usable medium having a computer readable code embodied therein for controlling a data processing system, the computer readable program code configured to cause the data processing system to execute a process for processing a scanned document, the scanned document containing a first barcode encoding information about the document and a second barcode encoding resolution data that specifies a spatial resolution of the first barcode, the second barcode having a spatial resolution lower than the spatial resolution of the first barcode, the process comprising the steps of:
  detecting the second barcode in the scanned document and extracting the resolution data encoded therein;
  comparing the spatial resolution of the first barcode specified in the resolution data to the first scan resolution to determine whether the first scan resolution is adequate; and
  if the first scan resolution is adequate, detecting the first barcode in the scanned document and extracting the information encoded therein.

* * * * *